Aug. 15, 1967 R. SIBILLE 3,335,858
DEVICE FOR PACKING ELONGATED OBJECTS SUCH AS
SUPPORTS PROVIDED WITH TEXTILE THREADS
Filed Sept. 20, 1965 2 Sheets-Sheet 1
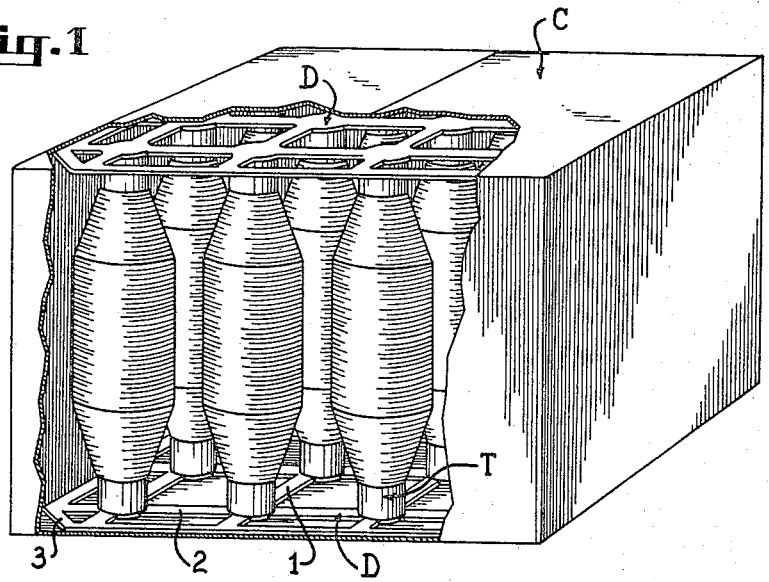
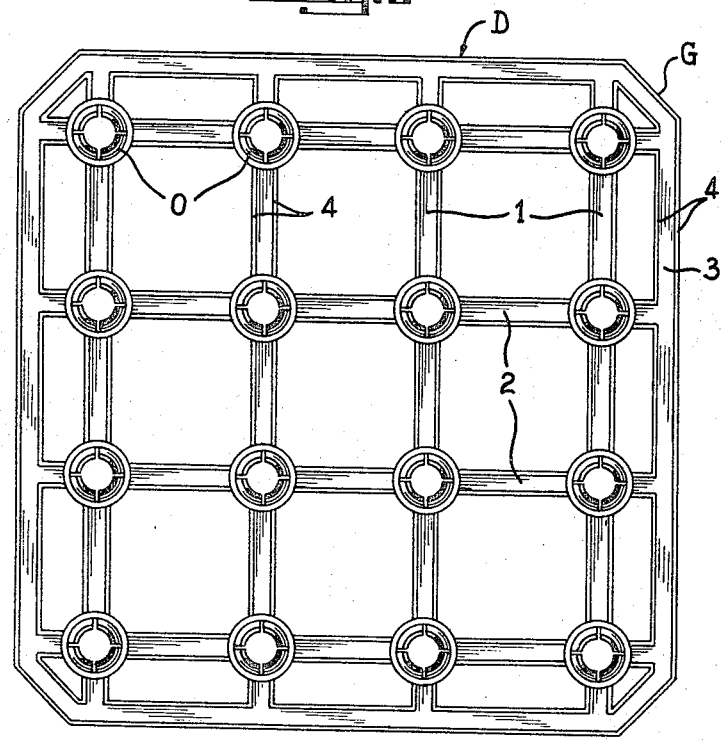

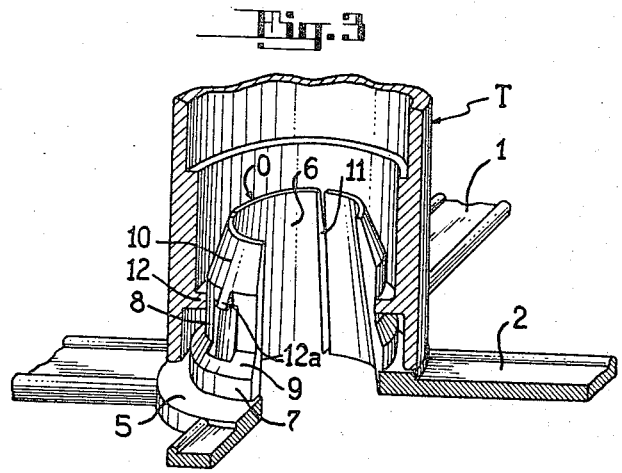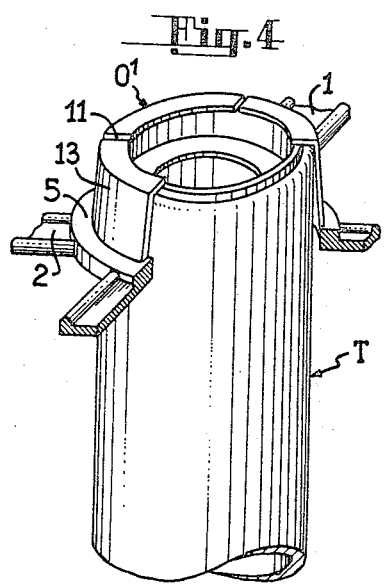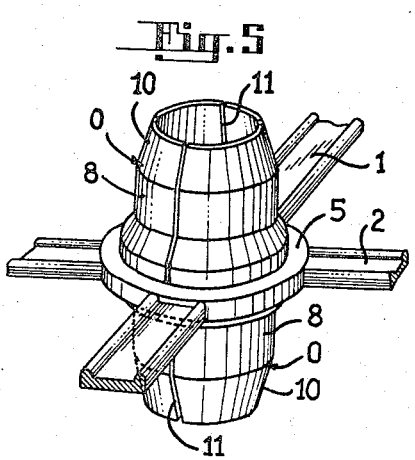

3,335,858
DEVICE FOR PACKING ELONGATED OBJECTS SUCH AS SUPPORTS PROVIDED WITH TEXTILE THREADS
Rene Sibille, Paris, France, assignor to Papeteries Rene Sibille, Les Echelles, Savoie, France, a French body corporate
Filed Sept. 20, 1965, Ser. No. 488,467
Claims priority, application France, Jan. 14, 1965, 1,884
4 Claims. (Cl. 206—65)

The present invention relates to the packing of long or elongated objects such as supports provided with textile threads.

When packing these supports (cones, spools, cops) it is necessary to maintain them spaced apart so that when handling and transporting the packages no damage occurs, owing to the striking of the supports against each other, to the supports (generally composed of light material) or to the threads wound thereon. The same problem exists in the packing of other fragile elongated objects.

It has already been proposed, in order to solve this problem, to insert objects of this type provided with an axial bore between two parallel cardboard sheets provided with openings in facing relation in which centering elements are engaged, these elements also being of cardboard and engaging in the axial bore of the objects so as to hold them in position. However, this requires an operation for assembling the sheets and the centering elements. Further, the introduction of the centering elements of the upper sheet in the axial bore of the objects already positioned on the lower sheet is carried out blindly and results in some difficulty. Further, the assembly thus obtained lacks rigidity and does not permit a precise positioning.

The object of the present invention is to remedy these drawbacks.

The invention provides a device for packing elongated objects, such as supports provided with textile threads, said device comprising a grid of plastics material, the bars of which are integral with centering elements for the objects to be packed which project from the plane of the grid. Such a grid is light and rigid, and easy to manufacture and place in position. Thus, such a grid can be mass-produced in a single operation, as for example by cluster injection moulding adapted for the invention. It is known that in cluster moulding a plurality of articles can be moulded in one stage, the cavities of the mould reproducing the shape of the article being interconnected by injection passages for injecting the plastics material formed in the mould. The bars of the plastics material formed in these passages are cut off at their connection to the moulded article. Thus, if there is provided a mould provided with cavities corresponding to the counterpart of the centering elements and if the cross-section of the passages connecting them is increased, the device according to the invention can be obtained in a single operation. The widened connecting passages produce the bars of the grid which are not detached, as they would have been in the normal process of cluster moulding, from the centering elements.

The placing in position of the device according to the invention when packing is facilitated owing to the fact that the centering elements and the grid are in one piece and the packer sees exactly the disposition of the objects to be packed through the apertures in the grid through which he can remedy any possible lack of alignment of the objects.

Further features and advantages of the invention will be apparent from the ensuing description, with reference to the accompanying drawings to which the invention is in no way limited.

In the drawings:

FIG. 1 is a perspective view, with a part cut away, of a package obtained by means of one embodiment of the device according to the invention;

FIG. 2 is a plan view of this device;

FIG. 3 is a perspective view on an enlarged scale, with a part cut away, of a centering element of the device shown in FIGS. 1 and 2;

FIG. 4 is a view similar to FIG. 3 of a variant of the centering element and,

FIG. 5 is a partial perspective view of another embodiment of the device according to the invention.

In the embodiment shown in FIGS. 1–3, the device D according to the invention is illustrated as being applied to the packing in a cardboard box C of support tubes or spools T carrying a winding of textile threads. The purpose of this device D is to maintain the tubes T in spaced relation in an invariable position so as to avoid any shocks therebetween when handling and transporting the boxes C.

The device D is composed of a grid G of plastics material in one piece with the centering elements O which are adapted to fit in the axial aperture or bore in the tubes T so as to hold them in position. The grid G comprises longitudinal bars 1 and transverse bars 2 which, in the illustrated embodiment, have the same length and are perpendicular to each other. However, it will be understood that they could have different lengths and any other suitable mutual orientation.

At the periphery of the grid the ends of all the bars are connected to a frame 3 so as to render the device B stiffer. For the same purpose, the edges of the frame and of each bar are provided with flanges or ribs 4. The centering elements O are disposed at each intersection of the bars 1 with the bars 2 and extend in a direction perpendicular to the plans of the grid.

Each centering element comprises (FIG. 3) an annular base 5 which has substantially the thickness of the bars 1 and 2 connected thereto and is surmounted by a head 6 composed alternately of cylindrical portions 7 and 8 and frusto-conical portions 9 and 10 so that the section of the head 6 decreases from the base 5 to its free end. The head 6 is provided with slots 11 equally spaced apart (four slots in the presently-described embodiment) so as to impart thereto a greater resilience, these slots extending along the inner face of the head into the base 5.

As has been explained, the grid G and the centering elements O can be moulded in a single operation as for example by an injection moulding employing the cluster moulding method adapted in a suitable manner. A suitable plastics material such as polystyrene can be employed in moulding the device D.

FIG. 3 illustrates the way in which the had 6 fits in the axial aperture of the tube T. The cylindrical portion 8 of this head is forced into the aperture of reduced diameter formed by an annular flange 12 on the inner wall of the tube T whose corresponding end rests on the base 5. The tube T is thus maintained in a resilient manner coaxial with the centering element O.

The manner in which the device according to the invention is employed will now be described.

A first device D is placed in position in the bottom of the box C of which it has approximately the same size. The lower ends of the tubes T are then slipped over the elements O of the device D, the spacing between the elements O being such that the tubes T carrying their threads are spaced from each other, as shown in FIG. 1.

A second device D is then placed on the upper ends of the tubes T, the centering elements of this device extending downwardly so as to fit into the upper ends of the tubes. It will be understood that the box C acts as connecting means which engages the devices D and prevents them from moving apart.

As the device D has an open structure it is possible to observe the tubes therethrough and it is easy to place the second device D in such position as to obtain the desired engagement. Should a tube be out of alignment, this would be seen immediately and the tube can be straightened up by passing the fingers through the grid G. Thus the positioning is simple and immediate, which was not possible with previous devices having a cardboard sheet which shut the tubes off from view and did not permit straightening the latter unless it were removed, which implied a series of trials and errors. Note, furthermore, that owing to the resilient holding of the tube T by the slotted heads 6, misalignment of the tubes T is much less frequent than with the previous devices which held the tubes much more loosely. This also facilitates the positioning.

The present invention makes it possible, if desired, to interconnect, as by ties, the bars of the lower device D with the corresponding bars of the upper device D. This tying ensures that the centering elements do not disengage from the tubes when, in the event of a blow, the grid G is deformed. Moreover, it permits obtaining a coherent assembly which can be transported without the cardboard box, a large number of packages of this type being stacked inside containers of large size (for example wagons or trucks).

The present invention also provides retaining lugs on the centering elements O so as to permit in certain cases the utilization of the grids G as unwinding supports. This device is shown in FIG. 3 in which a lug 12a has an orientation which permits the engaging and retaining of the annular flange 12.

In the foregoing description, reference has been made to tubes for textile threads. However, the invention is also applicable to other elongated objects without it being necessary that they have an axial aperture. Indeed, the centering elements instead of fitting into the objects can fit thereover. A suitable embodiment for this purpose is shown in FIG. 4. This embodiment differs from the preceding only in the shape of the centering elements $O_1$ whose base 5 is surmounted by a frusto-conical wall 13 terminating in an annular flange 14, the wall 13 and the flange having throughway slots 11. The frusto-conical wall can thus pinch the upper end of an object, such as tube T, in capping it. It is moreover possible to employ for the lower ends of objects to be packed a device D of the type shown in FIG. 4.

FIG. 5 shows another embodiment which differs from the embodiment shown in FIGS. 1–3 only by the fact that its centering elements are double, it being possible to consider each double element as being formed by the attachment of the bases 5 of two elements O of the type shown in FIGS. 1–3. This variant permits the stacking of a plurality of rows of objects in the same box and achieving a saving of the devices D since between each row one device is now sufficient instead of two.

Although specific embodiments of the invention have been described, many modifications and changes may be made therein without departing from the scope of the invention as defined in the appended claims.

Having now described my invention what I claim as new and desire to secure by Letters Patent is:

1. In a package comprising two vertically spaced support devices having centering elements which maintain a series of vertically disposed thread-carrying spools laterally and vertically in position by engagement with both ends of said spools, said centering elements being held in engagement with said spools by connecting means engaging said support devices so as to prevent said support devices from moving apart, the improvement that said support devices are each in the form of a grid having narrow bar portions which define large apertures and carry said centering elements, whereby said spools can be inspected and if need be placed in correct position relative to the corresponding centering elements owing to direct access to said spools via said apertures.

2. Package as claimed in claim 1, wherein said spools have hollow ends and the centering elements are split annular elements which are convergent from the part thereof connected to the grid towards the free ends of the centering elements, the free ends of the centering elements being resiliently yieldable so as to maintain the ends of said objects in a resilient manner.

3. Package as claimed in claim 1, wherein said connecting means is a box inclosing the two devices and said spools therebetween.

4. Package as claimed in claim 1, comprising a second series of said spools underlying the first-mentioned series of said spools, a further one of said devices being interposed between the two series of spools, said further one of the devices having double centering elements which have two halves projecting from both sides of the last-mentioned device and maintaining the corresponding ends of the two series of said spools.

References Cited
UNITED STATES PATENTS

| | | | |
|---|---|---|---|
| 1,775,229 | 9/1930 | Valentine | 206—52 |
| 1,966,247 | 7/1934 | Janssen. | |
| 2,662,638 | 12/1953 | Storer et al. | 206—65 |
| 2,704,600 | 3/1955 | Despres | 206—65 |

THERON E. CONDON, *Primary Examiner.*

WILLIAM T. DIXSON, JR., *Examiner.*